(12) United States Patent
Kohler et al.

(10) Patent No.: US 6,463,379 B1
(45) Date of Patent: Oct. 8, 2002

(54) DEVICE AND METHOD FOR INFLUENCING THE PROPULSION OF A VEHICLE

(75) Inventors: Rolf Kohler, Schwieberdingen; Johannes Schmitt, Markgroeningen; Guenter Braun, Bietigheim; Andreas Zoebele, Markgroeningen; Matthias Kottmann, Wendlingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/806,663
(22) PCT Filed: Sep. 2, 1999
(86) PCT No.: PCT/DE99/02774
§ 371 (c)(1), (2), (4) Date: Jun. 26, 2001
(87) PCT Pub. No.: WO00/18623
PCT Pub. Date: Apr. 6, 2000

(30) Foreign Application Priority Data

Sep. 30, 1998 (DE) .......................................... 198 44 912

(51) Int. Cl.⁷ ................................................. B60T 8/00
(52) U.S. Cl. ............................. 701/84; 701/89; 180/197
(58) Field of Search .............................. 701/84, 89, 90, 701/70; 180/197; 303/143, 113.2, 139

(56) References Cited

U.S. PATENT DOCUMENTS

| 4,763,263 A | * | 8/1988 | Leiber .......................... 701/90 |
| 4,804,058 A | | 2/1989 | Leiber et al. ................ 180/197 |
| 4,849,891 A | | 7/1989 | Krohn et al. .................. 701/89 |
| 5,407,257 A | | 4/1995 | Iwata ...................... 303/122.09 |

FOREIGN PATENT DOCUMENTS

| DE | 1 902 944 | 8/1970 |
| DE | 197 12 232 | 10/1997 |

* cited by examiner

Primary Examiner—William A. Cuchlinski, Jr.
Assistant Examiner—Marthe Y. Marc-Coleman
(74) Attorney, Agent, or Firm—Kenyon & Kenyon

(57) ABSTRACT

A device for influencing the propulsion of a vehicle includes a first arrangement for measuring a transverse acceleleration variable describing the transverse acceleration acting upon the vehicle, a second arrangement for determining a variable describing the time behavior of the transverse accelaretion variable, a third arrangement for determining an intervention variable at least as a function of the transverse acceleration variable and of the variable describing the time behavior of the transverse acceleration variable, and a fourth arrangement for carrying out at least engine interventions for influencing the propulsion as a function of the intervention variable.

20 Claims, 7 Drawing Sheets

DEVICE AND METHOD FOR INFLUENCING THE PROPULSION OF A VEHICLE

FIELD OF THE INVENTION

The present invention relates to a device and a method for influencing the propulsion of a vehicle.

BACKGROUND INFORMATION

German Published Patent Application No. 1 902 944 concerns a control device for preventing motor vehicles from skidding during cornering. The motor vehicle contains an antilock braking system, measuring elements which measure the driving condition, and final control elements which are controllable via the measuring elements. The measuring elements include gyroscope, wheel sensors, steering sensors, and potentiometers. The measuring elements are connected to a programmed control unit which responds to limiting values of the transverse acceleration of the vehicle. The final control elements for controlling the braking system and a power-controlling element of an internal combustion engine can be tripped via the control unit for directional stability. The directional stability device becomes active already below the maximum permissible transverse acceleration for the intended vehicle design so that the vehicle cannot get into an unstable driving condition. It is believed that there is no provision for making allowance for a variable describing the time behavior of the transverse acceleration.

SUMMARY OF THE INVENTION

An object of the exemplary embodiment and/or exemplary method of the present invention is to improve existing devices or methods for influencing the propulsion of a vehicle to the effect that the time or dynamic response of the vehicle is also allowed for in the influencing of the propulsion.

The exemplary embodiment and/or exemplary method of the present invention is directed to a device and/or a method for influencing the propulsion of a vehicle. The device includes a first apparatus, arrangement or structure which is used to measure a transverse acceleration variable describing the transverse acceleration acting upon the vehicle. According to an exemplary embodiment of the present invention, the device contains a second apparatus, arrangement or structure which is used to determine a variable describing the time behavior of the transverse acceleration variable. Moreover, the device has a third apparatus, arrangement or structure which is used to determine an intervention variable at least as a function of the transverse acceleration variable and of the variable describing the time behavior of the transverse acceleration variable. Furthermore, the device features a fourth apparatus, arrangement or structure which is used to carry out or perform at least engine interventions for influencing the propulsion, the engine interventions being carried out as a function of the intervention variable.

It is advantageous for the intervention variable to describe the throttle-valve angle to be adjusted, or the fuel injection quantity to be injected, or the ignition point to be adjusted. If the vehicle is equipped, for example, with an Otto spark ignition engine, then the throttle-valve angle or the ignition point (ignition angle) may be used as the intervention variable. In the case of a vehicle equipped with a diesel engine, the fuel injection quantity is usable. Ignition interventions permit a quick reduction of the engine torque.

The exemplary method according to the present invention can also be used for vehicles which are equipped with an electric motor. In this case, the electric current flowing through the motor is to be regarded as the intervention variable.

In addition to the engine interventions, it is also believed that it may be advantageous to carry out or perform interventions in the wheel brakes and/or in the clutch and/or in the transmission for influencing the propulsion of the vehicle. By appropriate interventions in the wheel brakes, the vehicular speed may be reduced. By interventions in the clutch, the drive train is opened for a short time as a result of which the driven wheels, being free from longitudinal forces, are able to transmit the maximum lateral force. As an intervention in the transmission, it is conceivable, for example, to shift up one gear to reduce the drive torque. The influencing of the propulsion torque can give rise to a limiting of, a reduction of or an increase in the propulsion torque.

The intervention variable is believed to be advantageously determined in such a manner that the vehicle is stabilized in the transverse direction by the engine intervention. Via the engine intervention and further interventions described above, the vehicle stability is influenced at the limit, thus supporting the driver in critical driving situations. In the propulsion case, the steerability of the vehicle is increased, the vehicle tends to understeer less strongly. In particular, the engine intervention is also intended to prevent the vehicle from tipping over about a vehicle axis oriented in the longitudinal direction of the vehicle.

In a first exemplary embodiment, a change variable describing the time-related change of the transverse acceleration variable is determined as the variable describing the time behavior of the transverse acceleration variable.

The exemplary device according to the present invention includes an apparatus, arrangement or structure which is used to determine a speed variable describing the vehicular speed. The intervention variable is determined as a function of this speed variable, of the transverse acceleration variable, and of the variable describing the time behavior of the transverse acceleration variable. For this end, the exemplary device according to the present invention advantageously has, in the third apparatus, arrangement or structure, a first determining apparatus, arrangement or structure which is used to determine a first value for the intervention variable as a function of the transverse acceleration variable and of the speed variable, and/or a second determining apparatus, arrangement or structure which is used to determine a second value for the intervention variable as a function of the variable describing the time behavior of the transverse acceleration variable and of the speed variable, and/or a third determining apparatus, arrangement or structure which is used to determine an incremental value for the intervention variable as a function of transverse acceleration variable and of the variable describing the time behavior of the transverse acceleration variable. The intervention variable is determined as a function of the first or of the second value and/or of the incremental value.

The three above described determining apparatus, arrangement or structure are implemented as characteristic maps. That is, predetermined values for the intervention variable or the incremental value, respectively, are read out from the respective characteristic maps as a function of the input variables, namely the speed variable and/or transverse acceleration variable and/or the variable describing the time behavior of the transverse acceleration variable. These predetermined variables can be determined in the preliminary stages, for example, on the basis of road tests or by model calculations. The first value of the intervention variable has the character of a static intervention variable since, being determined on the basis of the transverse acceleration variable, it allows for the static behavior of the vehicle. If the first intervention variable is used to influence the throttle-valve position, then the first value of the intervention variable constitutes a static throttle-valve limitation. In a corresponding manner, the second value of the intervention variable constitutes a dynamic throttle-valve limitation since it goes back to the variable describing the time behavior of the transverse acceleration variable. Both values have a limiting character because they are used as intervention variable in the case where, on the basis of the driver's command, a throttle-valve angle would have to be adjusted which would result in an unstable vehicle behavior in the present vehicle situation. For this reason, a throttlevalve angle which goes back to the first or second value of the intervention variable is adjusted in lieu of the throttle-valve angle which goes back to the driver's command.

In the case of the influencing of the throttle-valve position, the incremental value has the character of a throttle-valve increase limitation. If, for example, the throttle-valve angle is adjusted according to one of the two values of the intervention variables and the intention is for the throttle-valve angle to be brought near the throttle-valve angle going back to the driver's command, then the increase in the throttle-valve angle is limited in its increment to produce a smooth increase in the propulsion torque. The incremental value has the same function also in the case in which the throttle-valve position is adjusted according to one of the two values of the intervention variables and the values of the intervention variables increase because of the vehicle behavior.

The use of characteristic maps has the advantage that the intervention variable is continuously determined as a function of the transverse acceleration variable and of the variable describing the time behavior of the transverse acceleration variable.

The first value of the intervention variable advantageously depends on the transverse acceleration variable in such a way that this second value decreases as the value of the transverse acceleration variable increases and/or the first value of the intervention variable depends on the speed variable in such a way that this first value decreases as the value of the speed variable increases. The second value of the intervention variable advantageously depends on the variable describing the time behavior of the transverse acceleration variable in such a way that this second value decreases as the value of the variable describing the time behavior of the transverse acceleration variable increases and/or the second value of the intervention variable depends on the speed variable in such a way that this second value decreases as the value of the speed variable increases. The incremental value of the intervention variable advantageously depends on the transverse acceleration variable in such a way that this incremental value decreases as the value of the transverse acceleration variable increases and/or the incremental value of the intervention variable advantageously depends on the variable describing the time behavior of the transverse acceleration variable in such a way that this incremental value decreases as the value of the variable describing the time behavior of the transverse acceleration variable increases. It is particularly advantageous for the incremental value to assume a very small value, in particular the value zero, first of all, above a predefinable value of the transverse acceleration variable and, secondly, above a predefinable value of the variable describing the time behavior of the transverse acceleration variable.

It has turned out to be advantageous for the absolute value of the transverse acceleration variable and for the absolute value of the variable describing the time behavior of the transverse acceleration variable to be processed in the above mentioned determining apparatus, arrangement or structure. For this reason, the third apparatus, arrangement or structure have a first absolute-value generating apparatus, arrangement or structure which is used to generate the absolute value of the transverse acceleration variable. This absolute value is fed to the first and to the third determining apparatus, arrangement or structure. Moreover, the third apparatus, arrangement or structure has a second absolute-value generating apparatus, arrangement or structure which is used to generate the absolute value of the variable describing the time behavior of the transverse acceleration variable. This absolute value is fed to the second and to the third determining apparatus, arrangement or structure.

The third apparatus, arrangement or structure advantageously has selection apparatus, arrangement or structure which is used to determine a selection variable which has the character of a resulting throttle-valve limitation. The smaller of the two values for the intervention variable is selected as the selection variable. The intervention variable is determined as a function of this selection variable.

This procedure ensures that, at all events, the value of the intervention variable which describes or corresponds to the more critical vehicle condition is taken as the basis for the determination of the intervention variable. If, for example, a vehicle condition has a large transverse acceleration and a small time-related change of the transverse acceleration exists, then the first value determined for the intervention variable is smaller than the second value. Consequently, an engine intervention is required because of the transverse acceleration. The equivalent applies to a vehicle condition in which a small transverse acceleration but a large time-related change of the transverse acceleration exist. By this procedure, the intervention variable is believed to be advantageously limited as a function of the transverse acceleration variable and of the variable describing the time behavior of the transverse acceleration variable to values at which the vehicle behavior is stable.

The device includes an apparatus, arrangement or structure which is used to determine at least a driver command variable describing the driver's command with regard to the propulsion of the vehicle. This driver command variable is allowed for in the determination of the intervention variable. In particular, the driver command variable is used as the maximum value for the intervention variable. The apparatus, arrangement or structure, which is used to determine the driver command variable, may include, for example, a sensor apparatus, arrangement or structure which is allocated to the accelerator and used for detecting the position of the accelerator.

The driver command variable is believed to be advantageously allowed for in the determination of the intervention variable in such a way that the engine interventions are carried out as a function of the driver command variable as long as the value of the driver command variable is smaller than the selection variable. It is believed that this measure better ensures that the vehicle is not accelerated beyond the driver's command.

For the determination of the intervention variable, the third apparatus, arrangement or structure have a fourth determining apparatus, arrangement or structure which is used to determine the intervention variable as a function of the selection variable and/or of the incremental value and/or of the driver command variable.

At least the selection variable is determined for consecutive time steps, i.e., it is available in a value-discrete form for discrete time steps. Against the background, the following cases are to be distinguished for the determination of the intervention variable:

- if the driver command variable is smaller than the selection variable of the current time step, then the driver command variable is used as the intervention variable and/or
- if the driver command variable is greater than the prevailing selection variable, and if the selection variable of the current time step is smaller than or equal to the selection variable of the previous time step, then the selection variable of the current time step is used as the intervention variable and/or
- if the driver command variable is greater than the prevailing selection variable, and if the selection variable of the current time step exceeds the selection variable of the previous time step by a predefinable value, in particular by the incremental value, then the intervention variable is derived as the sum of the selection variable of the previous time step and the incremental value and/or
- if the driver command variable is greater than the prevailing selection variable, and if the selection variable of the current time step exceeds the selection variable of the previous time step but not by a predefinable value, in particular not by the incremental value, then the selection variable of the current time step is used as the intervention variable.

As already explained, the time-related increase in the intervention variable is believed to be advantageously limited by an incremental value.

Furthermore, it is believed to be advantageous for the intervention variable to be corrected as a function of at least one variable. One approach for this is using, for example, an altitude variable which describes or corresponds to the geographical altitude of the vehicle. This correction takes into account that at greater altitudes, a smaller engine output is available. Applicable is, moreover, a slope variable describing the road gradient in the vehicle's longitudinal axis. This correction allows for the tractive resistances caused due to the slope. In this connection, moreover, variables can be taken into account as a function of which the intervention variable is corrected to the effect that an equivalent engine torque is adjusted in all operating points of the engine.

The advantageous refinement which is the basis of the first exemplary embodiment can be summarized again as follows: the device for influencing the propulsion of the vehicle includes a first apparatus, arrangement or structure which is used into measure a transverse acceleration variable describing the transverse acceleration acting upon the vehicle. Furthermore, the device contains a second apparatus, arrangement or structure which is used to determine a variable describing the time behavior of the transverse acceleration variable. Moreover, the device has a third apparatus, arrangement or structure which is used to determine a first intervention variable as a function of the transverse acceleration variable as well as a fourth apparatus, arrangement or structure which is used to determine a second intervention variable as a function of the variable describing the time behavior of the transverse acceleration variable. In addition, the device includes a fifth apparatus, arrangement or structure which is used to carry out or perform at least engine interventions for influencing the propulsion, the engine interventions being carried out or performed as a function of the first or of the second intervention variable.

In a second exemplary embodiment, a period duration variable is determined as the variable describing the time behavior of the transverse acceleration variable, the period duration variable describing the time interval of two zero crossings of the transverse acceleration variable with the same sign reversal, in particular with a sign reversal from positive to negative values of the transverse acceleration variable.

It has turned out to be advantageous for the behavior of the vehicle indicating instability or for the previously known behavior of the vehicle to be determined as a function of the amplitude of the transverse acceleration variable and as a function of the period duration of the transverse acceleration variable. This procedure is believed to be particularly suitable for recognizing oscillations in the transverse acceleration variable which may indicate unstable behavior.

For the above reasons, the third apparatus, arrangement or structure advantageously have a first apparatus, arrangement or structure which is used to determine an amplitude variable describing the distance between a minimum value and a maximum value of the transverse acceleration variable within one period of the transverse acceleration variable. If, for example, the transverse acceleration variable exhibits an oscillation, then the minimum value of the amplitude corresponds to a negative half wave, and the maximum value of the amplitude corresponds to a positive half wave. It offers itself to make allowance for the maximum values and minimum values since an unstable vehicle condition shows itself in large fluctuations of the transverse acceleration variable. The intervention variable is determined as a function of this amplitude variable.

Moreover, the third apparatus, arrangement or structure has a second apparatus, arrangement or structure which is used to determine a weighting variable for the intervention variable as a function of the variable describing the time behavior of the transverse acceleration variable and/or of the amplitude variable. In a third apparatus, arrangement or structure which is included in the third apparatus, arrangement or structure described above, the intervention variable is determined as a function of this weighting variable and of a pre-value for the intervention variable, the pre-value depending at least on the driver's command.

The weighting variable is believed to be advantageously a numerator variable which is incremented, in particular by 1, if the amplitude variable is greater than a threshold value and if the period duration variable lies within a predefinable range of values. The numerator variable is believed to be advantageously limited to a maximum value. Moreover, the numerator variable is reset to a predefined value, in particular to zero, if the amplitude variable is smaller than the threshold value or if the numerator variable lies outside of the predefinable range of values.

Furthermore, it has turned out to be advantageous for the threshold value for the amplitude variable and/or for the range of values for the period duration variable to be predefined as a function of a speed variable describing the vehicular speed. This is useful against the background since the vehicle behavior changes, in terms of instability, to a great extent as a function of the vehicular speed. Thus, an adaptive evaluation is guaranteed.

The zero crossing of the transverse acceleration variable is believed to be advantageously determined as a function of the time-related change of the transverse acceleration variable.

The advantageous refinement which is the basis of the second exemplary embodiment can be summarized again as follows: the device for influencing the propulsion of the vehicle includes a first apparatus, arrangement or structure which is used to measure a transverse acceleration variable describing the transverse acceleration acting upon the vehicle. Furthermore, the device contains a second apparatus, arrangement or structure which is used to determine an indication variable which indicates whether the transverse acceleration variable exhibits a behavior indicating instability or a previously known behavior of the vehicle, in particular an oscillation. Moreover, the device has a third apparatus, arrangement or structure which is used to carry out or perform at least engine interventions for influencing the propulsion, the engine interventions being carried out or performed at least as a function of the indication variable.

DETAILED DESCRIPTION

Figure 1:
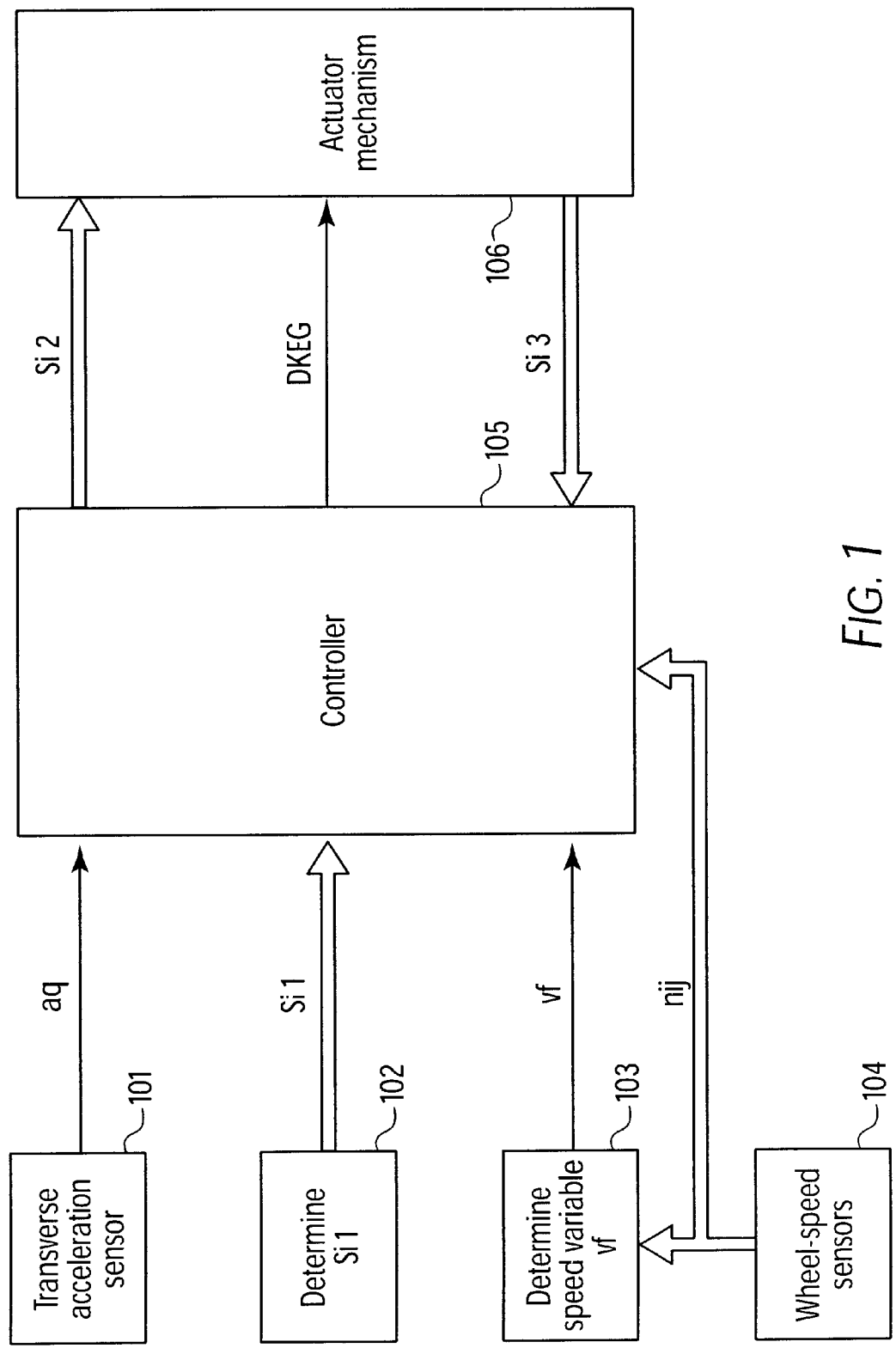
FIG. 1 shows an arrangement of the exemplary device according to the present invention for carrying out the exemplary method according to the present invention.

Block 101 represents a transverse acceleration sensor which is used to measure a transverse acceleration variable aq describing or corresponding to the transverse acceleration acting upon the vehicle. Transverse acceleration variable aq is fed to a block 105.

Block 102 represents an arrangement of different apparatus, arrangement or structure which is used to determine different variables or signals denoted by Si1. These include, first of all, a driver command variable DKF describing the driver's command with regard to the propulsion of the vehicle and, secondly, an altitude variable, a slope variable, or variables as a function of which an intervention variable, as a function of which engine interventions are carried out or performed, is corrected to the effect that an equivalent engine torque is adjusted in all operating points of the engine. These variables or signals Si1 are fed to block 105.

Block 104 represents wheel-speed sensors which are used to determine wheel-speed variables nij. These wheel-speed variables nij are fed or provided, first of all, to a block 103 and, secondly, to block 105.

At this point, the notation of the wheel-speed variables nij will be explained: index i indicates whether it is a wheel of the front axle (v) or a wheel of the rear axle (h). Index j indicates whether it is a right (r) or left (l) wheel.

In block 103, a speed variable vf describing the vehicular speed is determined in a manner which is known per se. Speed variable vf is fed to block 105.

Block 105 is a controller in which a control (that is, a closed-loop control) is executed, influencing the lateral dynamics of the vehicle. To determine the vehicle situation, transverse acceleration variable aq, wheel-speed variables nij, speed variable vf, variables or signals Si1, and, originating from block 106, variables or signals Si3 are fed to controller 105.

To influence the lateral dynamics of the vehicle, controller 105 outputs signals or variables Si2 as well as a further variable DKEG. Both signals or variables Si2 and variable DKEG are fed to a block 106 which represents the actuator mechanism contained in the vehicle.

The actuator mechanism is, first of all, of the kind used for influencing the engine or the engine torque delivered by it. If the vehicle possesses an Otto spark ignition engine, the actuator mechanism has actuators for influencing the throttle-valve position or the throttle-valve angle, or actuators for influencing the ignition point (ignition angle). If the vehicle possesses a diesel engine, then the actuator mechanism has actuators for influencing the supplied fuel quantity. If the vehicle possesses an electric motor as driving motor, the actuator mechanism has actuators for influencing the current flowing through the motor.

In the present exemplary embodiments, first of all, the vehicle is assumed to possess an Otto spark ignition engine and, secondly, intervention variable DKEG, as a function of which engine interventions are carried out or performed for influencing the engine torque, is intended to describe the throttle-valve angle. At this point, it should be mentioned that, in the case of a diesel engine, intervention variable DKEG would describe the supplied fuel quantity, and, in the case of an electric motor, intervention variable DKEG would describe the current flowing through the motor.

Secondly, the actuator mechanism is of the kind which permits interventions in the clutch and which is used for influencing the power transmission between the engine and the driven wheels, or which permits interventions in the transmission. As an intervention in the transmission, it is conceivable, for example, to shift up one gear to reduce the drive torque. Moreover, interventions in the brakes of the vehicle are also conceivable. The influencing of the drive torque can give rise to a limiting of, a reduction, or an increase in the drive torque. The above described interventions influence the vehicle stability at the limit, thus supporting the driver in critical driving situations. In the propulsion case, the steerability of the vehicle is increased, the vehicle tends less strongly to understeer.

Fed to controller 105 are variables or signals Si3 which originate from actuator mechanism 106 and which indicate the condition of the respective actuators and are allowed for in the closed-loop or open-loop control.

Figure 2:
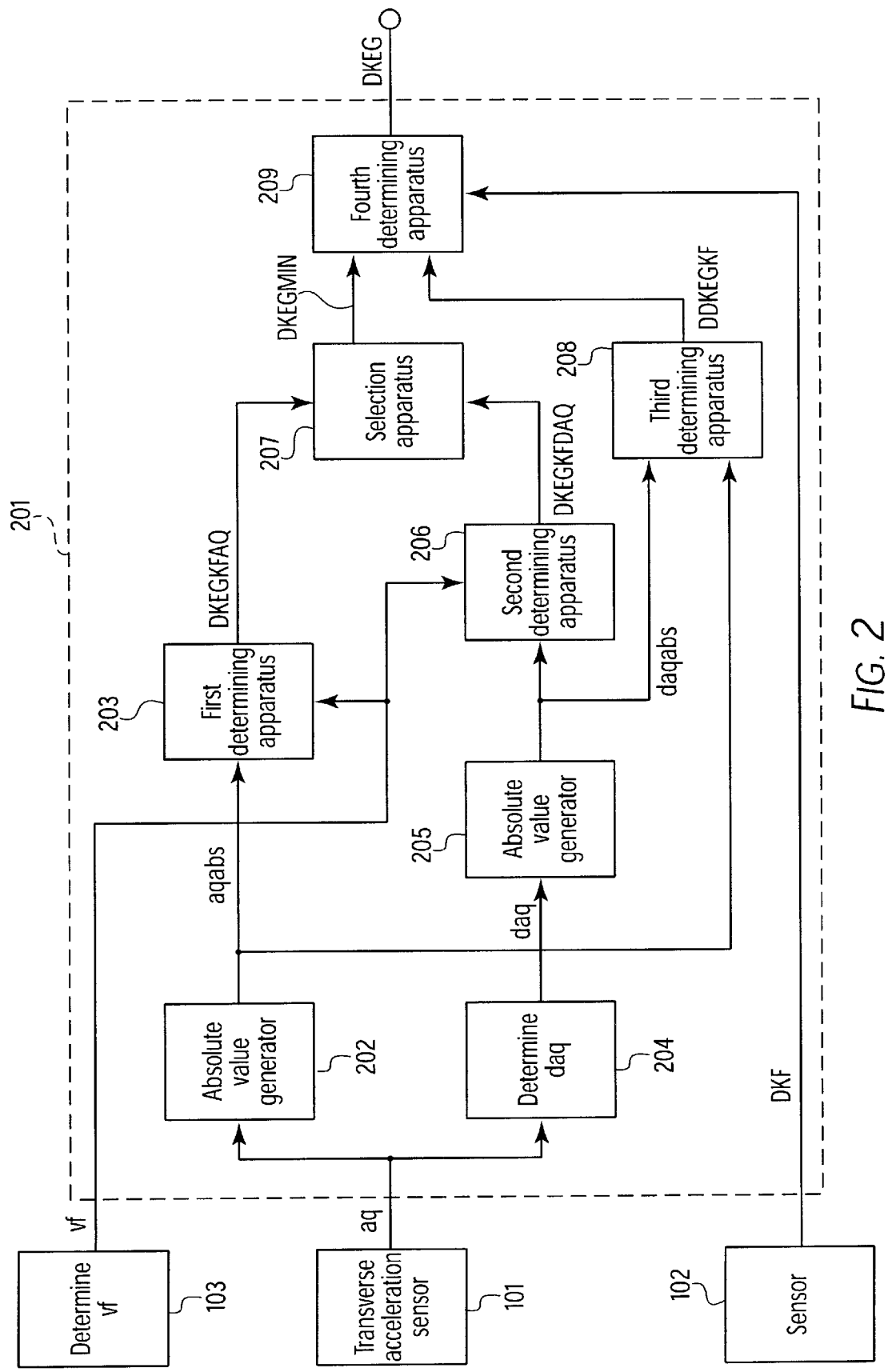
FIG. 2 shows a block diagram of a first exemplary embodiment.

In the following, FIG. 2 will be described which shows components 201 of a first exemplary embodiment. These components 201 are used to determine an intervention variable DKEG as a function of which engine interventions are carried out or performed for influencing the propulsion. In the present exemplary embodiment, the engine intervention to be carried out or performed is intended to be a throttle-valve intervention. Therefore, intervention variable DKEG describes or corresponds to the throttle-valve intervention to be carried out or performed.

Transverse acceleration variable aq measured with the assistance of transverse acceleration sensor 101 is fed to both a block 202 and to a block 204. Block 202 represents first absolute-value generating apparatus, arrangement or structure which is used to generate absolute value aqabs of transverse acceleration variable aq. Absolute value aqabs is fed or provided to both the first determining apparatus, arrangement or structure 203 and the third determining apparatus, arrangement or structure 208.

Block 204 represents apparatus, arrangement or structure which is used to determine a variable daq describing the time behavior of transverse acceleration variable aq. In the present exemplary embodiment, variable daq represents a change variable describing the time-related change of the transverse acceleration variable. In the concrete case, this is the gradient or the time derivation of transverse acceleration variable aq which are determined in a known manner. Variable daq describing the time behavior of transverse acceleration variable aq is fed a block 205.

Block 205 represents a second absolute-value generating apparatus, arrangement or structure which is used to generate absolute value daqabs of variable daq. The absolute value daqabs is fed or provided to both the second determining apparatus, arrangement or structure 206 and the third determining apparatus, arrangement or structure 208.

In determining apparatus, arrangement or structure 203, 206, and 208, the variables output by them are determined as a function of the input variables fed to them, using characteristic maps.

Fed to a first determining apparatus, arrangement or structure 203, in addition to absolute value aqabs of the transverse acceleration variable, is also speed variable vf. Using the first determining apparatus, arrangement or structure 203, a first value DKEGKFAQ for the intervention variable is determined as a function of absolute value aqabs and of speed variable vf. That is, the first value of the intervention variable is determined as a function of transverse acceleration variable aq and of speed variable vf. In this context, the first value of the intervention variable depends on the transverse acceleration variable in such a way that this second value decreases as the value of the transverse acceleration variable increases. Besides, the first value of the intervention variable depends on the speed variable in such a way that this first value also decreases as the value of the speed variable increases. First value DKEGKFAQ for the intervention variable is fed to a block 207.

Fed to the second determining apparatus, arrangement or structure 206, in addition to absolute value daqabs of the variable describing the time behavior of the transverse acceleration variable, is also speed variable vf. Using the second determining apparatus, arrangement or structure 206, a second value DKEGKFDAQ for the intervention variable is determined as a function of absolute value daqabs and of speed variable vf. That is, the second value of the intervention variable is determined as a function of variable daq describing the time behavior of the transverse acceleration variable and of speed variable vf. In this context, the second value of the intervention variable depends on the variable describing the time behavior of the transverse acceleration variable in such a way that this second value decreases as the value of the variable describing the time behavior of the transverse acceleration variable increases. Besides, the second value of the intervention variable depends on the speed variable in such a way that this second value decreases as the value of the speed variable increases. Second value DKEGKFDAQ is fed to a block 207.

Both values DKEGKFAQ and DKEGKFDAQ for the intervention variable are determined as a function of the transverse acceleration variable or of the variable describing the time behavior of the transverse acceleration variable, and of speed variable vf in such a manner that, during the vehicle conditions described by these variables, an instability of the vehicle is reduced by the influencing of the propulsion going back to the intervention variable or that imminent instability does not come about or occur.

Block 207 represents selection apparatus, arrangement or structure which is used to determine a selection variable DKEGMIN. The smaller of the two values DKEGKFAQ and DKEGKFDAQ for the intervention variable is selected as the selection variable. Selection variable DKEGMIN is fed to a block 209.

In a third determining apparatus, arrangement or structure 208, an incremental value DDKEGKF for the intervention variable is determined as a function of absolute value aqabs of the transverse acceleration variable and of absolute value daqabs of the variable describing the time behavior of the transverse acceleration variable. That is, the incremental value is determined as a function of the transverse acceleration variable and of the variable describing the time behavior of the transverse acceleration variable. In this context, the incremental value of the intervention variable depends on the transverse acceleration variable in such a way that this incremental value decreases as the value of the transverse acceleration variable increases. Besides, the incremental value of the intervention variable depends on the variable describing the time behavior of the transverse acceleration variable in such a way that this incremental value decreases as the variable describing the time behavior of the transverse acceleration variable increases. In particular, the incremental value assumes a very small value, in particular the value zero, first of all, above a predefinable value of the transverse acceleration variable and, secondly, above a predefinable value of the variable describing the time behavior of the transverse acceleration variable. Incremental value DDKEGKF is fed to block 209.

Block 209 represents fourth determining apparatus, arrangement or structure which is used to determine intervention variable DKEG as a function of selection variable DKEGMIN, of incremental value DDKEGKF, and of a driver command variable DKF. Driver command variable DKF describes or corresponds to the driver's command with regard to the propulsion of the vehicle. To determine the driver command variable, provision is made for the apparatus, arrangement or structure 102. The apparatus, arrangement or structure 102 include, for example, a sensor apparatus, arrangement or structure which is allocated to the accelerator and which is used for detecting the position of the accelerator. Originating from apparatus, arrangement or structure 102, driver command variable DKF is fed to block 209.

By using characteristic maps in determining apparatus, arrangement or structure 203, 206 and 208, it is achieved that the intervention variable is continuously determined as a function of the transverse acceleration variable and of the variable describing the time behavior of the transverse acceleration variable.

The concrete procedure in determining intervention variable DKEG will be discussed in connection with FIG. 3. It should be mentioned in advance, however, that driver command variable DKF is virtually used as the maximum value for the intervention variable. That is, as long as the value of driver command variable DKF is smaller than the value of the selection variable DKEGMIN, the engine interventions are carried out or performed as a function of driver command variable DKF.

Figure 3:
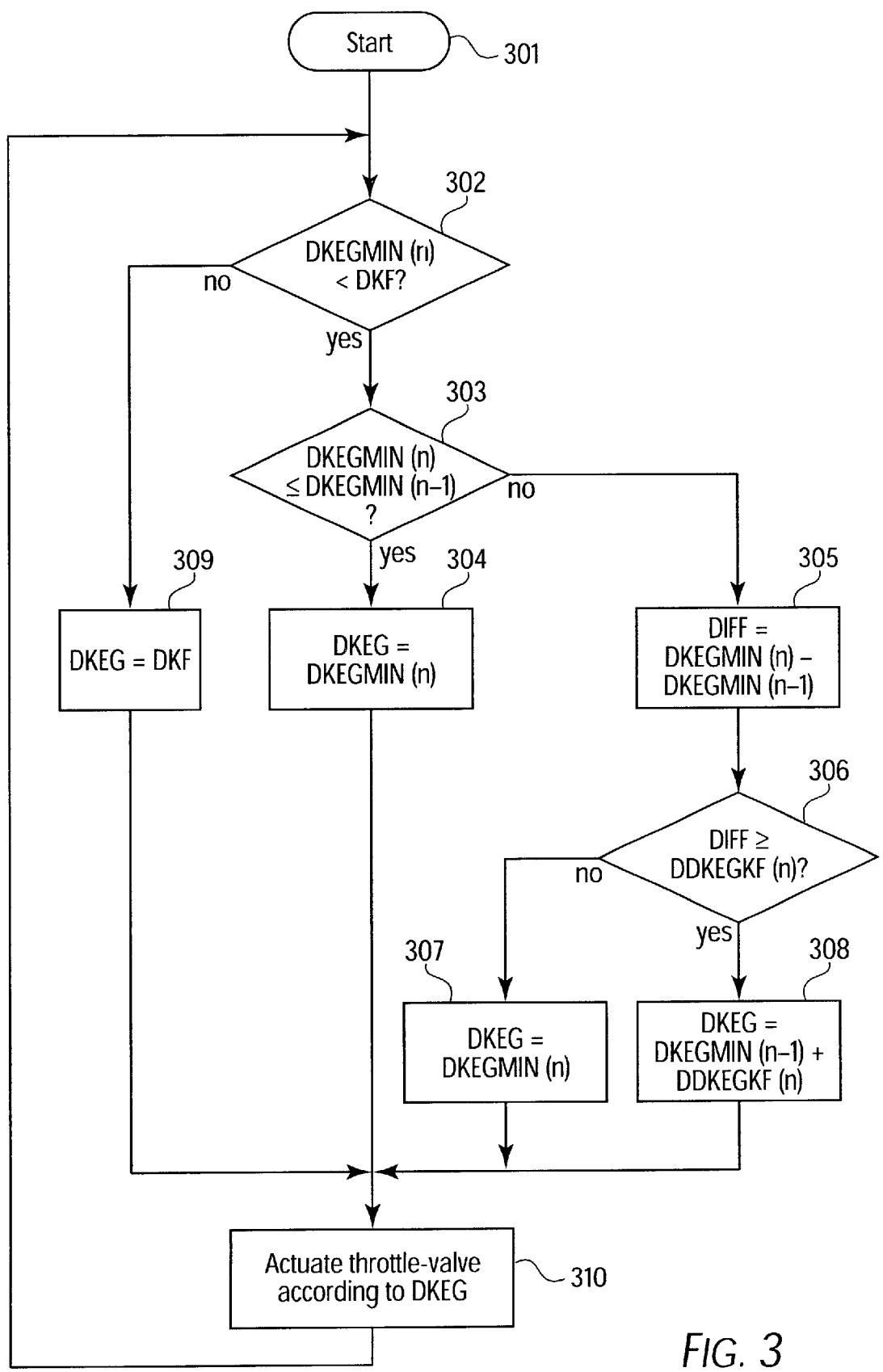
FIG. 3 shows a flow chart of a first exemplary embodiment.

FIG. 3, which shows the sequence of steps which are taken as the basis for the first exemplary embodiment, will be discussed in the following.

The exemplary method according to the present invention starts with a step 301 which is followed by a step 302. At this point, it should be mentioned that selection variable DKEGMIN is determined for consecutive time steps. Consequently, it is available in a time-discrete and value-discrete form. In FIG. 3, the current time step is denoted by (n), and the previous time step is denoted by (n−1).

In step 302, it is checked whether value DKEGMIN(n) of the selection variable of a current time step (n) (the verbal denomination of the time step will be dispensed with hereinafter) is smaller than driver command variable DKF. If, in step 302, it is established that driver command variable DKF is smaller than value DKEGMIN(n) of the selection variable, then a step 309 is executed subsequent to step 302, intervention variable DKEG being assigned the value of driver command variable DKF in step 309. This assignment signifies that the driver's command is used as the maximum value for the intervention variable, as already explained above. It is believed that this is because in this case, it is to be assumed that no vehicle instability will occur in response to influencing the propulsion as a function of the driver's command. Subsequent to step 309, a step 310 is executed.

If, however, in step 302, it is established that driver command variable DKF is greater than value DKEGMIN(n) of the selection variable, then a step 303 is executed subsequent to step 302. In step 303, it is checked whether value DKEGMIN(n) of the selection variable is smaller than or equal to value DKEGMIN(n−1) of the selection variable. If this is the case, then a step 304 is executed subsequent to step 303, intervention variable DKEG being assigned value DKEGMIN(n) in step 304. Subsequent to step 304, step 310 is executed.

If, however, in step 303, it is established that value DKEGMIN(n) of the selection variable is greater than value DKEGMIN(n−1) of the selection variable, then a step 305 is executed subsequent to step 303. In this step 305, difference DIFF between value DKEGMIN(n) and value DKEGMIN(n−1) is generated. Subsequent to step 305, step 306 is executed. In step 306, it is checked whether variable DIFF is greater than or equal to incremental value DDKEGKF(n). If this is the case, then a step 308 is executed subsequent to step 306. In this step 308, intervention variable DKEG is assigned the sum from DKEGMIN(n−1) and DKEGMIN(n). Subsequent to step 308, step 310 is executed.

If, however, in step 306, it is established that difference DIFF is smaller than incremental value DDKEGKF(n), then a step 307 is executed subsequent to step 306. In this step 307, intervention variable DKEG is assigned value DKEGMIN(n). Subsequent to step 307, step 310 is executed.

By the operations executed in steps 305, 306, 307, and 308, the following is implemented: if, because of the vehicle situation, a value DKEGMIN(n) for the selection variable is determined which is greater in comparison with value DKEGMIN(n−1) of the previous time step, then.the resulting increase in the intervention variable is limited. The increase limitation is carried out or performed in step 308 on the basis of incremental value DDKEGKF(n). That is, the timerelated increase in the intervention variable is limited by incremental value DDKEGKF.

Via the exemplary method shown in FIG. 3, a limitation of the intervention variable is carried out or performed in the case that, due to the driver's command, larger propulsion would have to be adjusted than is possible on the basis of the vehicle situation in view of stable vehicle behavior. That is, the intervention variable is limited as a function of the transverse acceleration variable and of the variable describing the time characteristic of the transverse acceleration variable to values at which the vehicle behavior is stable.

In step 310, the throttle-valve is actuated according to intervention variable DKEG. Subsequent to step 310, step 302 is executed again.

Figure 6:
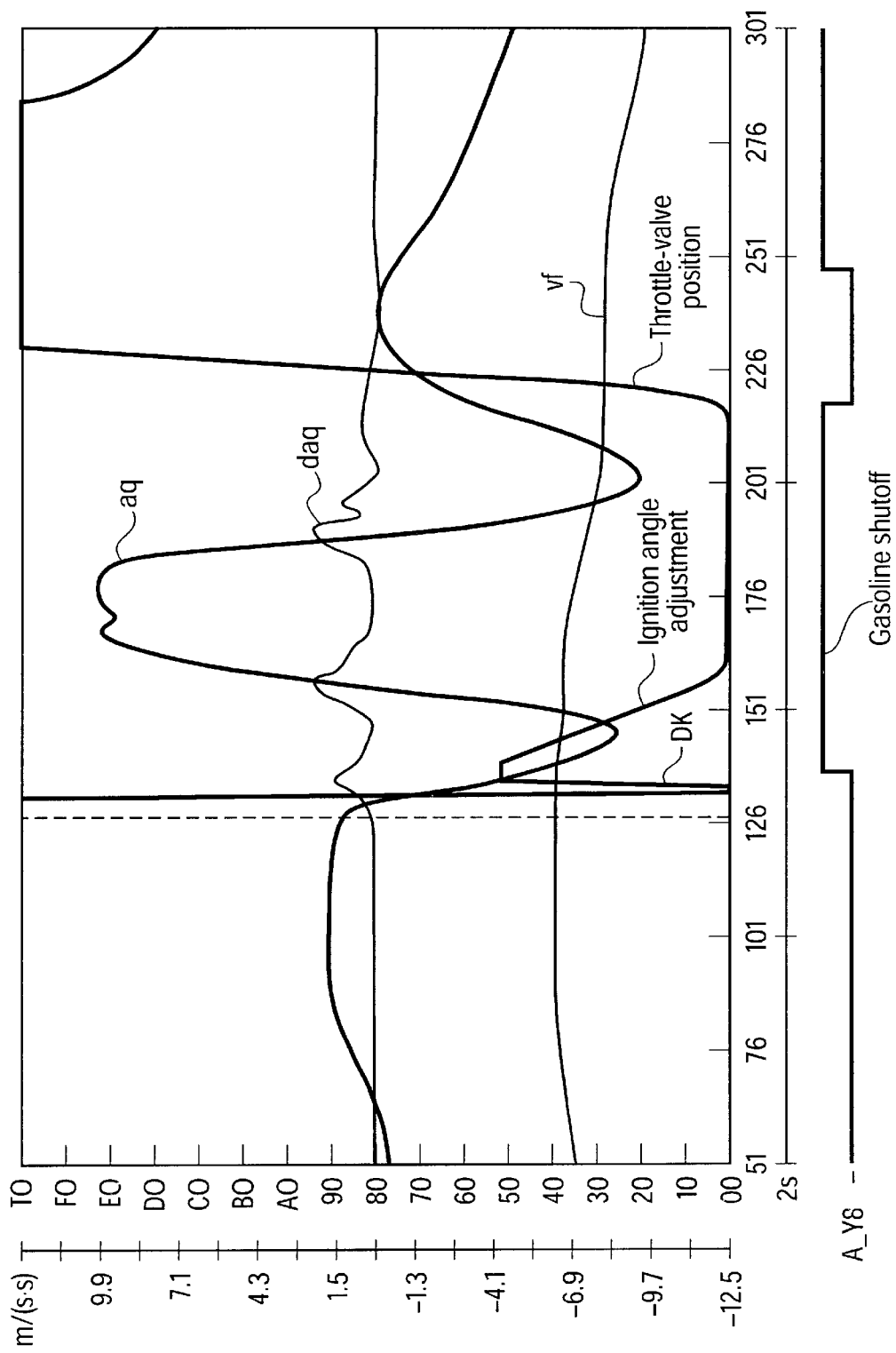
FIG. 6 shows various signal patterns or patterns of variables.

At this point, reference is made to FIG. 6. FIG. 6 shows an exemplary pattern of transverse acceleration variable aq and of variable daq. Different interventions or the effects of different interventions can be inferred from FIG. 6.

Figure 4:
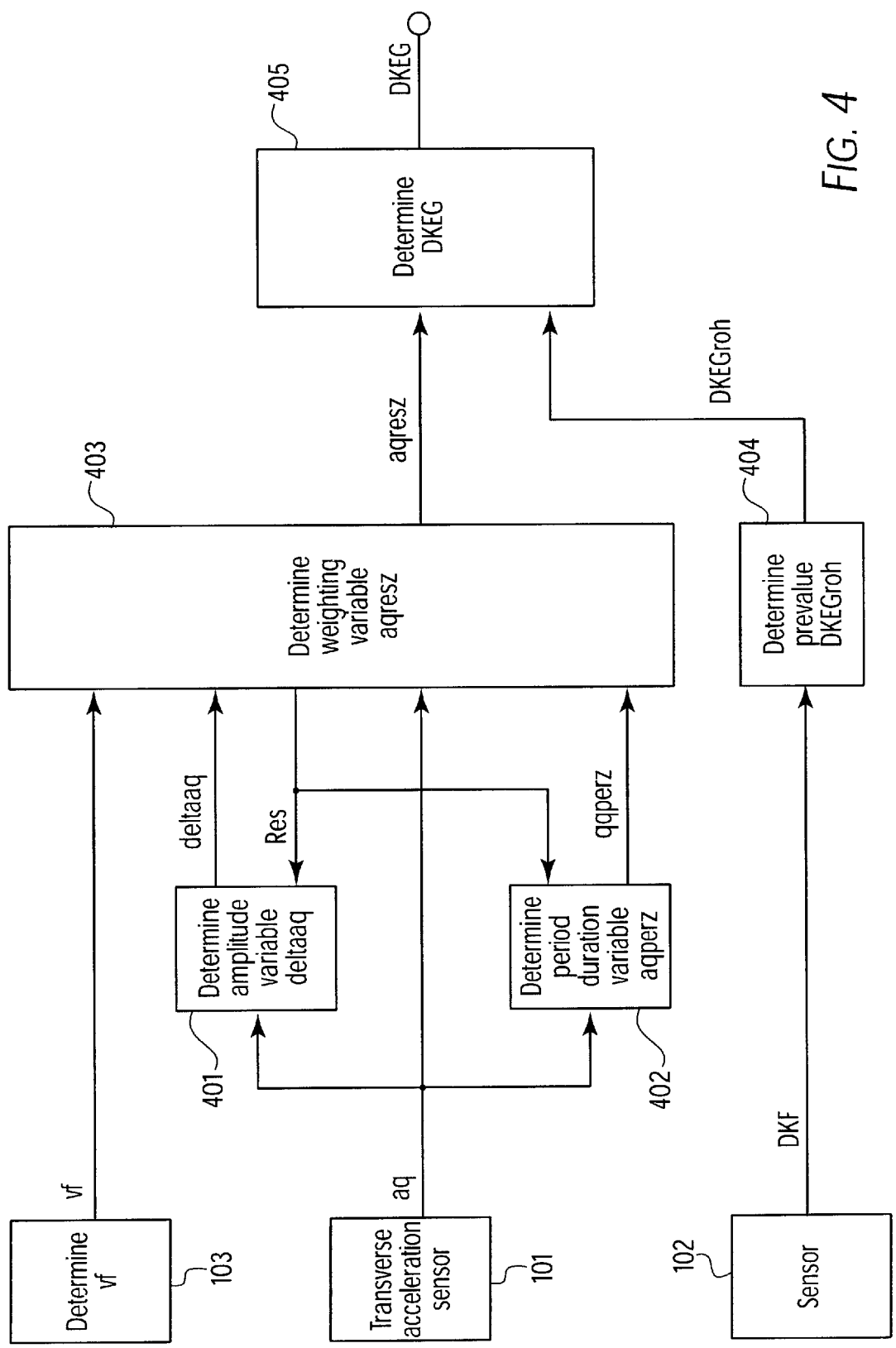
FIG. 4 shows a block diagram of a second exemplary embodiment.

In the following, FIG. 4, which shows the arrangement taken as the basis for the second exemplary embodiment, is described.

In the second exemplary embodiment, a period duration variable aqperz is determined in block 402 as the variable describing the time behavior of the transverse acceleration variable, the period duration variable describing the time interval of two zero crossings of the transverse acceleration variable with the same sign reversal. For this, for example, sign reversals from positive to negative values of the transverse acceleration variable can be considered. The other sign reversal may also be taken into account or considered. To determine period duration variable aqperz, transverse acceleration variable aq is fed to block 402. Period duration variable aqperz is fed to a block 403.

Block 401 represents an apparatus, arrangement or structure which is used to determine an amplitude variable deltaaq describing the distance between a minimum value and a maximum value of the transverse acceleration variable within one period of the transverse acceleration variable. For this, transverse acceleration variable aq is fed to block 401. Amplitude variable deltaaq is fed to a block 403. If the transverse acceleration variable exhibits an oscillation, for example due to the vehicle behavior, then the maximum value represents the amplitude of the positive half wave and the minimum value represents the amplitude of the negative half wave.

Block 403 represents an apparatus, arrangement or structure which is used to determine a weighting variable aqresz for the intervention variable as a function of period duration variable aqperz and amplitude variable deltaaq. To determine weighting variable aqresz, moreover, a speed variable vf and transverse acceleration variable.aq are fed to block 403. Weighting variable aqresz determined in block 403 is fed to a block 405.

The determination of weighting variable aqresz will be discussed in detail in connection with FIG. 5. At this point, reference is made just to variable Res which, originating from block 403, is fed to blocks 401 and 402, and which allows these two blocks to be initialized.

Block 405 represents an apparatus, arrangement or structure which is used to determine intervention variable DKEG as a function of weighting variable aqresz and of a pre-value depending at least on the driver's command.

Applicable as pre-value DKEGroh for the intervention variable is either the driver's command, i.e., driver command variable DKF itself. In this case, block 404 shown in FIG. 4 would not have any significance. Driver command variable DKF would be fed directly to block 405. Or the value for the intervention variable determined with the assistance of apparatus, arrangement or structure 201 is applicable. In this case, block 404 would correspond to block 201.

Figure 5:
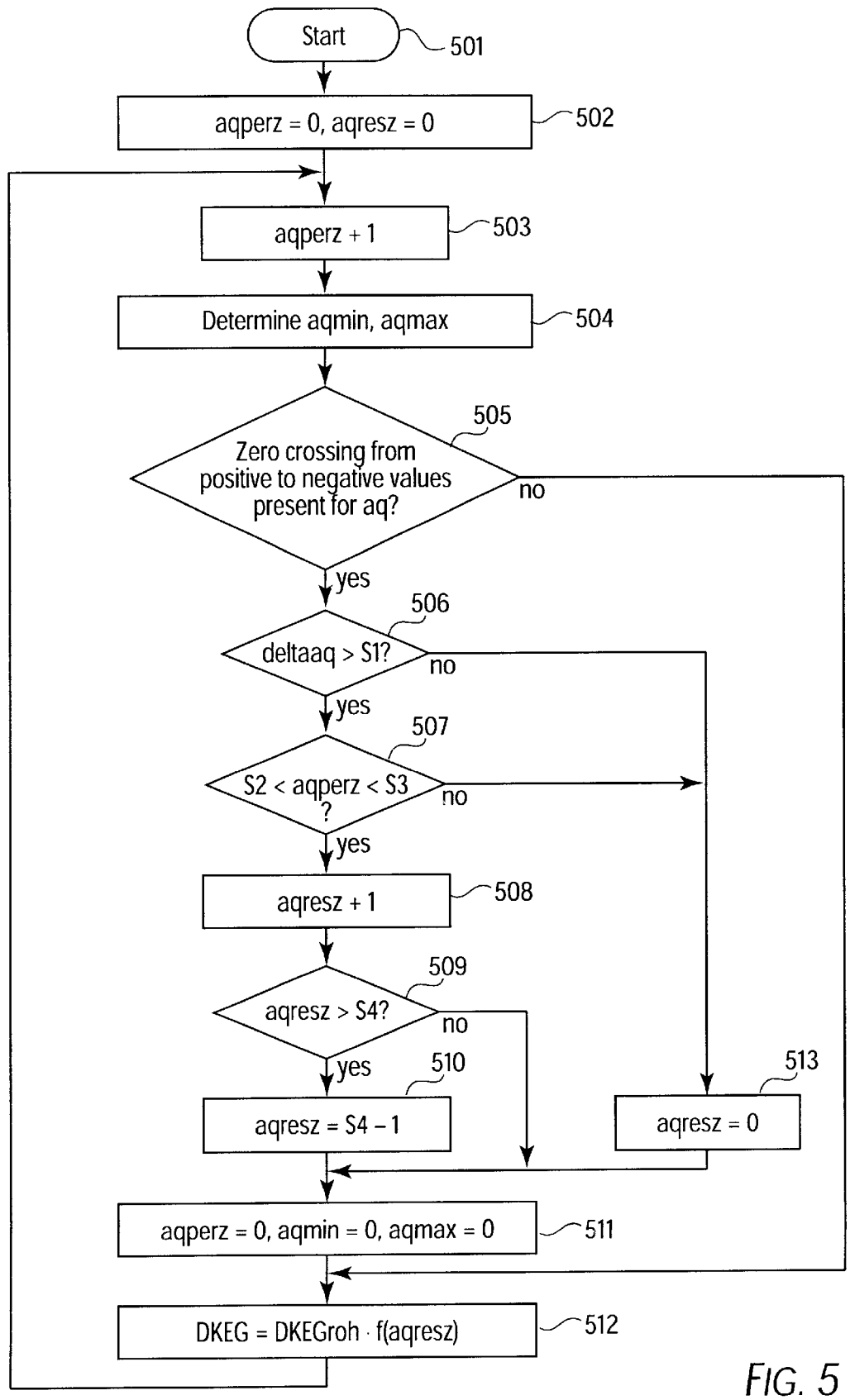
FIG. 5 shows a flow chart of a second exemplary embodiment.

FIG. 5 which shows the concrete sequence of steps taken as the basis for the second exemplary embodiment will be described in the following.

The exemplary method of the second exemplary embodiment according to the present invention starts with a step 501 which is followed by a step 502. In this step, both weighting variable aqresz and period duration variable aqperz are initialized. To this end, both variables are assigned the value zero. For this purpose, variable Res, originating from block 403, is fed to blocks 401 and 402, as indicated in FIG. 4.

Subsequent to step 502, a step 503 is executed in which period duration variable aqperz is increased by one (1). In connection with step 505, which is still to be described, the time interval of two zero crossings of the transverse acceleration variable with the same sign reversal, i.e., in the case of an oscillation, the period duration, is determined by repeatedly executing step 503.

Step 503 is followed by a step 504. In this step, a maximum value aqmax and a minimum value aqmin of the transverse acceleration variable are determined. Subsequently, step 505 is executed. In this step, it is checked whether a zero crossing from positive to negative values is present for transverse acceleration variable aq. If this is the case, then a step 506 is subsequently executed. If, however, no corresponding zero crossing is present, then a step 512 is executed subsequent to step 505.

The zero crossing of the transverse acceleration variable is determined, for example, as a function of the time-related change of the transverse acceleration variable.

In step 506, it is checked whether amplitude variable deltaaq is greater than a threshold value S1. Amplitude variable deltaaq is determined in block 402 and corresponds, for example, to the absolute value of the difference generated from maximum value aqmax and minimum value aqmin. If amplitude variable deltaaq is greater than threshold value S1, which indicates that the vehicle performs, for example, a maneuver during which it oscillates in the transverse direction or is unstable, then a step 507 is executed subsequent to step 506. If amplitude variable deltaaq is smaller than threshold value S1, then a step 513 is subsequently executed since in this case, no critical situation exists with regard to the handling properties of the vehicle.

In step 507, it is checked whether period duration variable aqperz is greater than a threshold value S2 and smaller than a threshold value S3, i.e., whether period duration variable aqperz lies within this range of values. If this is the case, then a step 508 is executed subsequent to step 507. If this is not the case, then step 513 is subsequently executed. In this step 513, weighting variable aqresz is reset, i.e., it is assigned the value zero, since it has been established, via the interrogations carried out or performed in steps 506 or 507, that no critical vehicle conditions exist. Subsequent to step 513, a step 511 is executed.

In step 508, a weighting variable aqresz is increased by one (1) since both the amplitude condition interrogated in step 506 and the period duration condition interrogated in step 507 are fulfilled, which indicates that a critical vehicle condition exists. Subsequent to step 508, a step 509 is executed. In this step, it is checked whether the weighting variable is greater than a threshold value S4. If this is the case, then a step 510 is subsequently executed in which the weighting variable is limited to a value S4−1. Subsequent to step 510, step 511 is executed. If, however, it is established in step 509 that the weighting variable is smaller than threshold value S4, wherefore a limitation is not required, then step 511 is directly executed subsequent to step 509.

In step 511, period duration variable aqperz, minimum value aqmin, and maximum value aqmax are reset, i.e., they are assigned the value zero. Subsequent to step 511, step 512 is executed. In this step, intervention variable DKEG is determined by weighting a pre-value DKEGroh for the intervention variable as a function of weighting variable aqresz. In this context, the weighting may be carried out or performed, first of all, directly by weighting factor aqresz. Secondly, weighting by a functionality f(aqresz) is also conceivable. In lieu of weighting the intervention variable, it is also conceivable to weight the transverse acceleration variable.

Subsequent to step 512, step 503 is executed again.

Both threshold value S1 for the amplitude variable and threshold values S2 and S3 defining the range of values for the period duration variable are predefined as a function of speed variable vf.

The steps shown in FIG. 5 are executed in blocks 401, 402, 403, and 405.

Figure 7:
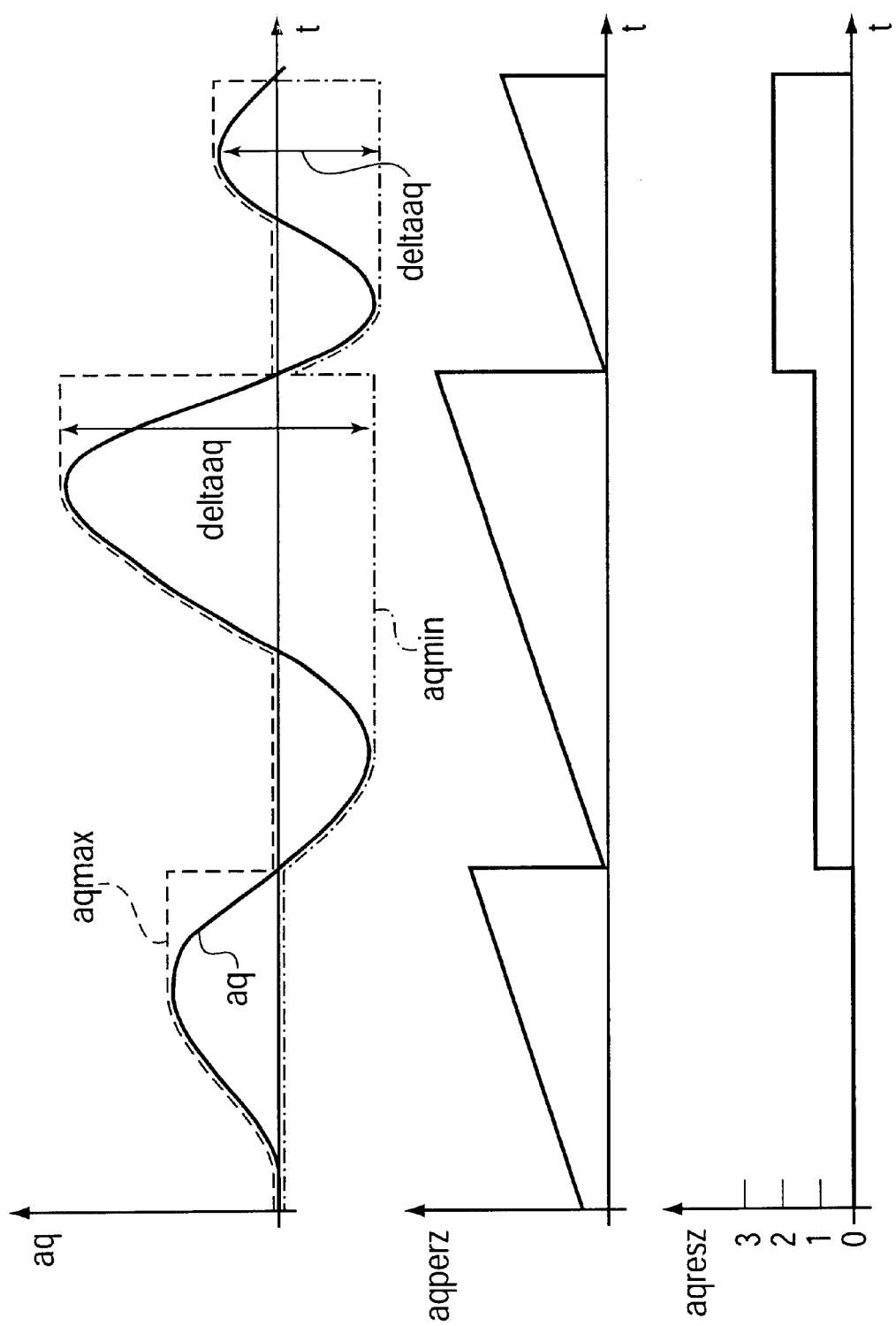
FIG. 7 shows other various signal patterns or patterns of variables.

At this point, reference is made to FIG. 7. FIG. 7 shows a pattern for transverse acceleration variable aq exhibiting an oscillation. The significance of variables aqmax, aqmin, deltaaq, aqperz, and aqresz can be gathered, by way of example, from FIG. 7.

As already mentioned, the intervention variable can be corrected. In this context, it is conceivable, for example, to carry out or perform a correction as a function of an altitude variable describing the geographical altitude of the vehicle, and/or carry out or perform a correction as a function of slope variable describing the road gradient in the vehicle's longitudinal axis, and/or carry out or perform a correction as a function of variables as a function of which the intervention variable is corrected to the effect that an equivalent engine torque is adjusted in all operating points of the engine.

Depending on the type of engine with which the vehicle is equipped, as already mentioned, the intervention variable describes or corresponds to the throttle-valve angle to be adjusted, or the fuel injection quantity, or the ignition point to be adjusted, or the current flowing through the motor.

The influencing of the propulsion as a function of the intervention variable can result in limiting, reducing or increasing the drive torque.

In addition to the engine interventions, the interventions may also be carried out or performed in the wheel brakes and/or in the clutch and/or in the transmission for influencing the propulsion of the vehicle. That is, the devices or methods shown in the Figures can be used for all of these intervention variables in a corresponding manner.

It is believed that it may be advantageous for the lateral tire forces to be measured and allowed for in the determination of the intervention variable.

Usable as the variable describing the time behavior of the transverse acceleration variable is also a variable which describes or corresponds to the frequency of the transverse acceleration variable.

In the preceding embodiments, vehicle conditions or driving situations were described in which the vehicle behaves in an unstable manner, and which are intended to be recognized. Some will be listed in the following: slaloming, fishtailing, driving in a circle or cornering at a corresponding vehicular speed, evasive maneuvers, lane-changing maneuvers, VDA swerve section as well as skidding. These vehicle conditions or driving situations can also be detected, for example, via the steering angle, the yaw angle, the speed behavior or on the basis of speed differences.

What is claimed is:

1. A device for influencing a propulsion of a vehicle, the device comprising:
   a first arrangement for measuring a transverse acceleration variable corresponding to a transverse acceleration acting upon the vehicle;
   a second arrangement for determining at least one time behavior variable corresponding to a time behavior of the transverse acceleration variable, the at least one time behavior variable including a period duration variable corresponding to a time interval of two zero-crossings of the transverse acceleration variable with a sign reversal, the sign reversal being at least one of a same sign reversal and a reversal from positive to negative values of the transverse acceleration variable;
   a third arrangement for determining an intervention variable at least based on the transverse acceleration variable and on the at least one time behavior variable and
   a fourth arrangement for performing at least one intervention, the at least one intervention including at least one engine intervention for influencing the propulsion, the at least one engine intervention being performable based on the intervention variable.

2. The device of claim 1, wherein the at least one time behavior variable includes a change variable corresponding to a time-related change of the transverse acceleration variable.

3. The device of claim 1, wherein at least one of the following is satisfied:
   the device includes a speed variable arrangement for determining a speed variable corresponding to a vehicular speed; and
   the third arrangement includes at least one of a first determining arrangement for determining a first value for the intervention variable based on the transverse acceleration variable and on the speed variable, a second determining arrangement for determining a second value for the intervention variable based on the at least one time behavior variable, and a third determining arrangement for determining an incremental value for the intervention variable based on the transverse acceleration variable and on the at least one time behavior variable, the intervention variable being determinable based on at least one of the first value, the second value and the incremental value.

4. The device of claim 3, wherein the third arrangement includes at least one of:
   a first absolute-value generating arrangement for generating an absolute value of the transverse acceleration variable, the absolute value being providable to at least one of the first determining arrangement and the third determining arrangement; and
   a second absolute-value generating arrangement for generating another absolute value of the at least one time behavior variable, the another absolute value being providable to at least one of the second determining arrangement and the third determining arrangement.

5. The device of claim 3, wherein:
   the first value of the intervention variable depends on the transverse acceleration variable so that the second value decreases as the transverse acceleration variable increases;
   the first value of the intervention variable depends on the speed variable so that the first value decreases as the speed variable increases;
   the second value of the intervention variable depends on the at least one time behavior variable so that the second value decreases as the at least one time behavior variable increases;
   the second value of the intervention variable depends on the speed variable so that the second value decreases as the speed variable increases;
   the incremental value of the intervention variable depends on the transverse acceleration variable so that the incremental value decreases as the transverse acceleration variable increases; and
   the incremental value of the intervention variable depends on the at least one time behavior variable so that the incremental value decreases as the at least one time behavior variable increases, the incremental value assuming at least one of a very small value and a zero value when at least one predefinable value is exceeded, the at least one predefinable value being for at least one of the transverse acceleration variable and the at least one time behavior variable.

6. The device of claim 3, wherein the third arrangement includes a selection arrangement for determining a selection variable by selecting a smaller one of the first value and the second value of the intervention variable as the selection variable, and the intervention variable is determinable based on the selection variable.

7. The device of claim 1, further comprising a driver command arrangement for determining at least a driver command variable corresponding to a driver command regarding the propulsion of the vehicle, the driver command arrangement including a sensor arrangement for detecting a position of an accelerator;
   wherein the driver command is at least one of considered in determining the intervention variable, and used as a maximum value for the intervention variable.

8. The device of claim 7, wherein the at least one engine intervention is performable based on the driver command variable when the driver command variable is smaller than the selection variable.

9. The device of claim 7, wherein the third arrangement includes a fourth determining arrangement for determining the intervention variable based on at least one of the selection variable, the incremental value and the driver command variable.

10. The device of claim 9, wherein:
    at least the selection variable is determinable for consecutive time steps; and
    the intervention variable is determinable according to at least one of the following:
    the driver command variable, if the driver command variable is greater than a prevailing selection variable;
    the selection variable of an instantaneous time step, if the selection variable of the instantaneous time step is not greater than the selection variable of a previous time step;
    a derivation of a sum of the selection variable of the previous time step and the incremental value, if the driver command variable is greater than the prevailing selection variable, and if the selection variable of the instantaneous time step exceeds the selection variable of the previous time step by at least one of a predefinable value and the incremental value; and
    the selection variable of the instantaneous time step, if the driver command variable is greater than the prevailing selection variable, and if the selection variable of the instantaneous time step exceeds the selection variable of the previous time step but does not exceed the selection variable by at least one of the predefinable value and the incremental value.

11. The device of claim 1, wherein at least one of the following is satisfied:

the incremental value limits a time-related increase in the intervention variable;

the intervention variable is essentially continuously determinable based on the transverse acceleration variable and the at least one time behavior variable;

the intervention variable is limitable based on the transverse acceleration variable and the at least one time behavior variable to intervention variable values for which the vehicle exhibits stable behavior; and the intervention variable is correctable based on at least another variable, the at least another variable including at least one of:

an altitude variable corresponding to a geographical altitude of the vehicle;

a slope variable corresponding to a road gradient in a longitudinal axis of the vehicle; and at least one engine torque correcting variable for providing that a corresponding engine torque is adjusted for all engine operating points.

12. The device of claim 1, wherein the third arrangement includes at least one of:

an amplitude variable arrangement for determining an amplitude variable corresponding to a distance between a minimum and a maximum of the transverse acceleration variable within one period of the transverse acceleration variable, the intervention variable being determined based on the amplitude variable;

a weighting variable arrangement for determining a weighting variable for the intervention variable based on at least one of the at least one time behavior variable and the amplitude variable; and another arrangement for determining the intervention variable based on the weighting variable and a pre-value for the intervention variable depending at least on a driver command.

13. The device of claim 12, wherein the weighting variable is at least one of:

a numerator variable being at least one of incrementable and incrementable by 1, if the amplitude variable is greater than a threshold value and if the period duration variable is within a predefinable range of values, the numerator variable being limitable to a maximum value; and reset to at least one of a predefined value and zero, if one of the following conditions is satisfied: the amplitude variable is smaller than the threshold value; and the numerator variable is outside of the predefinable range of values.

14. The device of claim 13, wherein at least one of the threshold value for the amplitude variable and the predefinable range of values for the period duration variable are predefinable based on a speed variable corresponding to a vehicular speed.

15. The device of claim 1, wherein a zero-crossing of the transverse acceleration variable is determinable based on a time-related change of the transverse acceleration variable.

16. The device of claim 1, wherein the intervention variable is determinable so that the at least one engine intervention operates to stabilize the vehicle in a transverse direction, the at least one engine intervention being intended to prevent the vehicle from tipping over about a vehicle axis oriented in a longitudinal direction of the vehicle.

17. The device of claim 1, wherein the intervention variable corresponds to at least one of a throttle-valve angle adjustment, a fuel injection quantity and an ignition point adjustment.

18. The device of claim 1, wherein the at least one intervention further includes at least one of a wheel brake intervention, a clutch intervention and a transmission intervention, each being performable for influencing the propulsion of the vehicle.

19. A device for influencing a propulsion of a vehicle, the device comprising:

a first arrangement for measuring a transverse acceleration variable corresponding to a transverse acceleration acting upon the vehicle;

a second arrangement for determining a variable indicating if the transverse acceleration variable exhibits at least one of an oscillatory behavior indicating instability and a previous oscillatory behavior;

a third arrangement for performing at least an engine intervention for influencing the propulsion, the at least one engine intervention being performable at least based on the variable.

20. A device for influencing a propulsion of a vehicle, the device comprising:

a first arrangement for measuring a transverse acceleration variable corresponding to a transverse acceleration acting upon the vehicle;

a second arrangement for determining a variable corresponding to a time behavior of the transverse acceleration variable;

a third arrangement for determining a first intervention variable based on the transverse acceleration variable;

a fourth arrangement for determining a second intervention variable based on at least one time behavior variable corresponding to a time behavior of the transverse acceleration variable; and a fifth arrangement for performing the at least one engine intervention for influencing the propulsion, the at least one engine intervention being performable based on at least one of the first intervention variable and the second intervention variable.

* * * * *